United States Patent [19]
Inoue et al.

[11] Patent Number: 5,237,736
[45] Date of Patent: Aug. 24, 1993

[54] ASSEMBLING AND MACHINING APPARATUS HAVING TRANSFER MEANS FOR WORKPIECES AND PARTS

[75] Inventors: Tsuyoshi Inoue, Kanagawa; Akira Kimura, Tokyo; Naruhiko Abe, Kanagawa; Hideo Kawabe, Saitama, all of Japan

[73] Assignee: Sony Corporation, Japan

[21] Appl. No.: 831,980

[22] Filed: Feb. 6, 1992

[30] Foreign Application Priority Data

Feb. 15, 1991 [JP] Japan .................. 3-042397

[51] Int. Cl.$^5$ ................ B23Q 7/00
[52] U.S. Cl. ................ 29/563; 29/33 P; 198/346.1; 198/340
[58] Field of Search ............ 29/33 P, 563; 198/346.1, 346.3, 340

[56] References Cited

U.S. PATENT DOCUMENTS

| 3,530,571 | 9/1970 | Perry ................ 29/563 |
| 4,783,904 | 11/1988 | Kimura . |

FOREIGN PATENT DOCUMENTS

| 0229244 | 7/1987 | European Pat. Off. . |
| 0387487 | 9/1990 | European Pat. Off. . |
| 1817914 | 10/1973 | Fed. Rep. of Germany ...... 198/340 |
| 3700192A1 | 12/1987 | Fed. Rep. of Germany . |
| 87409 | 4/1988 | Japan .................. 198/340 |
| 27300 | 1/1989 | Japan .................. 198/346.1 |
| 7811978 | 6/1980 | Netherlands .......... 29/563 |
| 2127765 | 4/1984 | United Kingdom . |

Primary Examiner—Daniel W. Howell
Attorney, Agent, or Firm—Ronald P. Kananen

[57] ABSTRACT

Disclosed is an assembling and machining apparatus which allows flexibly for changes in the machining/assembling setup following a modification in the production line configuration, thereby reducing the down time that occurs between such changes. Workpieces and/or part feeding pallets circulate along a loop-like transfer path composed of a first and a second transfer path and of two return units. A transfer unit takes the necessary workpiece or pallet from the circulation on the transfer path into a working area of one assembling/machining unit for work. With the current work completed, the workpiece or pallet is returned to the transfer path for subsequent work. The process is suitably performed by each assembling/machining unit. The workpiece or pallet on which all work is completed is detected by detecting means, either for transfer to the transfer path of the next adjacent assembling and machining apparatus or for ejection out of the current apparatus.

3 Claims, 9 Drawing Sheets

ASSEMBLING AND MACHINING APPARATUS HAVING TRANSFER MEANS FOR WORKPIECES AND PARTS

BACKGROUND OF THE INVENTION

1. Field of the Invention

The present invention relates to a novel machining and assembling apparatus and, more particularly, to a novel machining and assembling apparatus which allows flexibly for changes in the machining or assembling setup following a modification in the production line configuration, thereby reducing the down time that occurs between such changes.

2. Description of the Prior Art

The trends in recent years for multiple-item, small-lot production have given rise to a production method whereby a single production line carries a plurality of workpieces or part feeding pallets simultaneously for machining or assembling.

In such a setup, the production line is partitioned into a plurality of suitable production units. Each production unit utilizes at least one general-purpose robot to accomplish the task assigned thereto. This makes it possible to allow for not-too-significant changes in the workpiece machining or part assembling procedure.

However, once a production unit configuration is decided on the production line, the configuration itself is difficult to modify. Where a significant change is required of the workpiece, there is no choice but to initiate a major effort to modify the production unit configuration constituting the production line so as to accommodate that change.

Specifically, as shown in FIG. 9, reference character a represents a single assembling and machining line. Reference characters A, B and C are production units each having a robot.

A workpiece b flows on the line a through the units A, B and C, in that order. After completion of the treatment in each production unit, the workpiece b is taken out to a delivery position c.

If a change in the workpiece requires rearranging the units into A, C and B for production in that order, the conventional approach is to have the units B and C switch their places. That is, a differently arranged production line d needs to be re-established, as shown in FIG. 10.

Such rearrangement of the production line setup takes considerable time; it most often takes more than half a production day. Multiple-item small-lot production generally calls for such setup changes frequently. As a result, the plant having this type of production line often suffers significantly in productivity.

SUMMARY OF THE INVENTION

It is therefore an object of the invention to overcome the above and other deficiencies and disadvantages of the prior art, and to improve the prior art. In carrying out the invention and according to one aspect thereof, there is provided an assembling and machining apparatus having transfer means for workpieces and parts, comprising: a first and a second transfer path disposed one on top of the other, the first and the second transfer paths transferring in opposite directions any one of two object groups, one group consisting of workpieces and the other group consisting of part feeding pallets; a return unit interposed anywhere between an intermediate point and the downstream end, inclusive, of the first path and the second path, the return unit relocating any one of the two object groups from the first transfer path to the second transfer path; a return unit for relocating any one of the two object groups from the second transfer path to the first transfer path; a plurality of assembling/machining units positioned above the first transfer path; a plurality of first detection units mounted on the first transfer path close to the plurality of assembling/machining units, the plurality of first detection units detecting the type and status of any one of the two object groups on the first transfer path; and a plurality of transfer units located adjacent to working areas of the plurality of assembling/machining units, the plurality of transfer units retrieving from the first transfer path any one of the two object groups detected by any of the plurality of first detection units for any of later machining and assembling, the plurality of transfer units further returning any one of the two object groups to the first transfer path after any of the machining and assembling.

According to another aspect of the invention, there is provided an assembling and machining apparatus of the above-defined type, wherein the return units comprise a plurality of second detection units for detecting information about any one of the two object groups so that in any one of two cases, one in which the machining on a workpiece is completed and the other in which a part feeding pallet has delivered the part assigned thereto, any one of the workpiece and the part feeding pallet will be placed onto the first transfer path for transfer out of the assembling and machining apparatus.

According to a further aspect of the invention, there is provided an assembling and machining apparatus of the above-defined type, wherein each of the plurality of transfer units comprises: a retrieving mechanism for retrieving from the first transfer path any one of the two object groups for relocation to the working area of each of the plurality of assembling/machining units; and a returning mechanism for returning any one of the two object groups to the first transfer path after any of assembling and machining by each of the plurality of assembling/machining units.

With this assembling and machining apparatus, workpieces and/or part feeding pallets circle through a loop-shaped transfer path made of the first and second transfer paths as well as of two return units. A transfer unit retrieves a necessary workpiece and/or part feeding pallet from the transfer path and brings it into the working area of an assembling/machining unit for assembling or machining. After treatment by the assembling/machining unit, the workpiece or part feeding pallet is returned by the transfer unit onto the transfer path. This process is repeated by each assembling/machining unit. When a given workpiece has undergone all machining processes or when a part feeding pallet has delivered its part, such workpiece or part feeding pallet is detected and the appropriate return unit hands it over to the adjacent transfer path or ejects it out of the transfer path.

The workpiece on which all machining is completed is ejected by the last assembling/machining unit out of the assembling and machining apparatus. Even if a change in the machining on the workpiece requires the machining sequence to differ from the physical arrangement of the assembling/machining units, this scheme makes it possible to proceed with machining without the need to have the assembling/machining units change their places to accomodate that change.

Where each of the assembling/machining units performs a different task, some units may take less time than others in accomplishing their tasks. While other assembling/machining units are busy, some units may stand idle after having exhausted the parts in the part feeding pallets. In such cases, the currently idle units may be programmed to help out the other units. This boosts the efficiency of the assembling/machining process.

These and other objects, features and advantages of the invention will become more apparent upon a reading of the following description and appended drawings.

DESCRIPTION OF THE PREFERRED EMBODIMENT

A preferred embodiment of the invention will now be described in detail with reference to the accompanying drawings. First of all, the embodiment is outlined below with reference to FIGS. 1 through 5.

Figure 1:
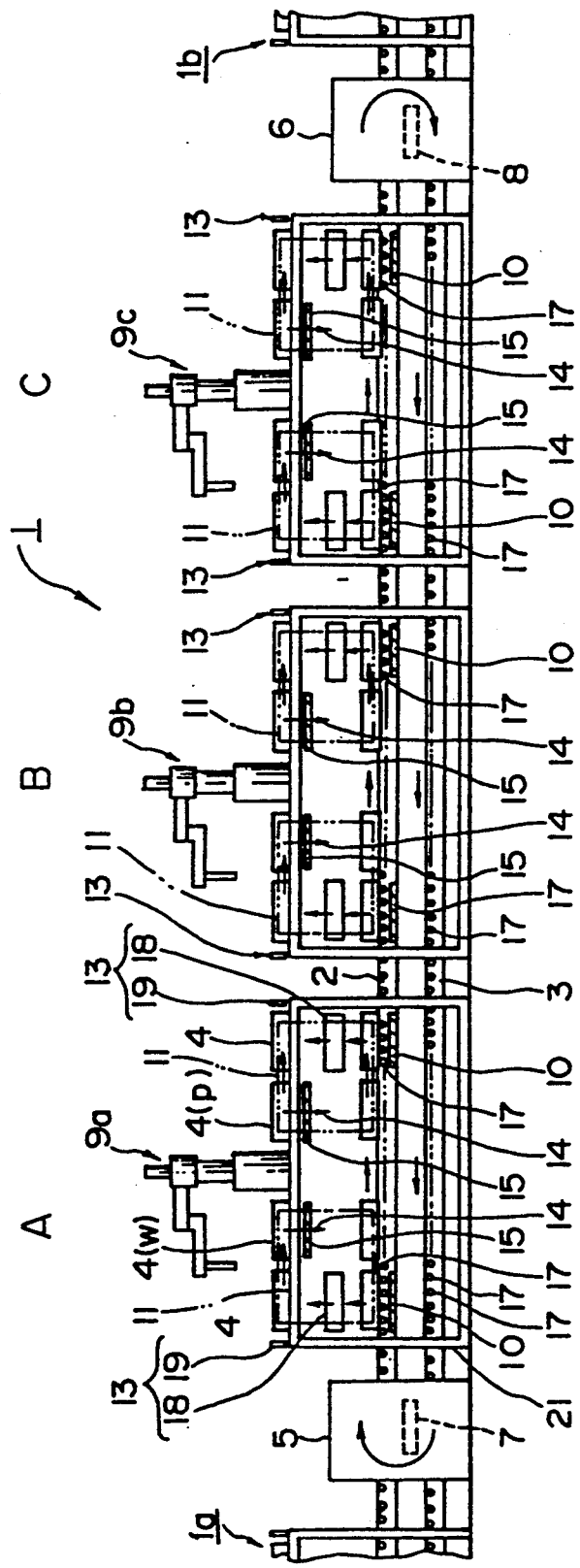
FIG. 1 is a side view of an assembling and machining apparatus embodying the invention.
Figure 2:
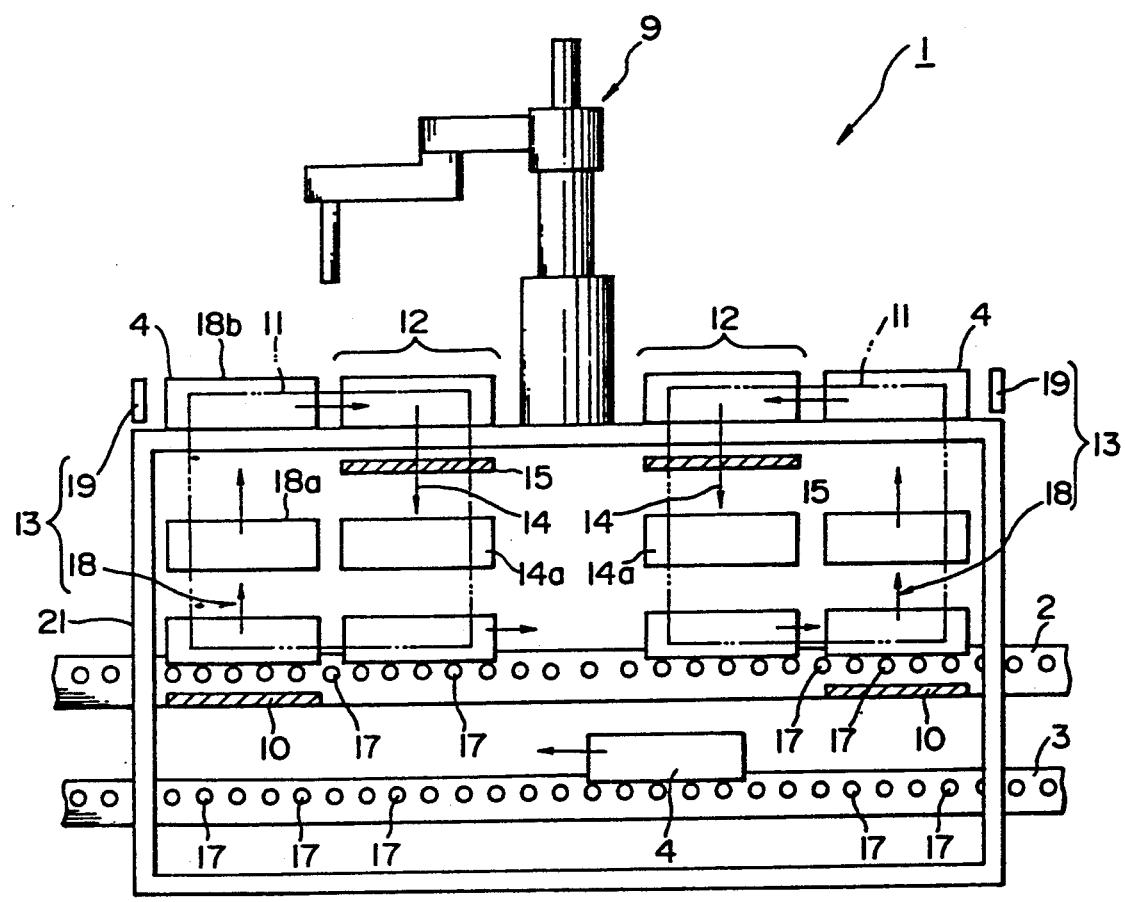
FIG. 2 is a side view of an assembling/machining unit of the embodiment.

An assembling and machining apparatus 1 has a first transfer path 2 and a second transfer path 3 disposed one on top of the other. As shown in FIG. 1, workpieces 4(w) or part feeding pallets 4(p) denoted generically as 4, 4, etc., move from left to right along the first transfer path 2, and from right to left along the second transfer path 3.

Return units 5 and 6 are located at both ends of the two transfer paths 2 and 3. The upstream side return unit 5 transfer workpieces or part feeding pallets 4, 4, etc. from the second transfer path 3 to the first 2. The downstream side return unit 6 transfers workpieces or part feeding pallets 4, 4, etc. from the first transfer path 2 to the second 3. The two transfer paths 2 and 3 and the two return units 5 and 6 make up a loop-shaped transfer path for the assembling and machining apparatus 1.

The upstream side return unit 5 doubles as the downstream side return unit for an assembling and machining apparatus 1a on the upstream side of the current assembling and machining apparatus 1. Likewise, the downstream side return unit 6 doubles as the upstream side return unit for another assembling and machining apparatus 1b on the downstream side of the current assembling and machining apparatus 1.

The return units 5 and 6 have detecting means 7 and 8 respectively. The detecting means 7 in the upstream side return unit 5 checks, in the case of workpieces, 4(w) to see if the assembling and machining apparatus 1a has completed machining on all the workpieces moving along the transfer path pertaining to that apparatus. In the case of part feeding pallets, 4(p) the detecting means 7 checks to see if all the pallets 4(p) along the transfer path associated with the apparatus 1a have all delivered their parts. If so, the finished workpieces 4(w) or the empty part feeding pallets 4(p) are not returned to the second transfer path 3 of the assembling and machining apparatus 1a. Instead, the finished workpieces 4(w) are moved to the first transfer path 2 of the assembling and machining apparatus 1; the empty part feeding pallets 4(p) are ejected out of the production line. The detecting means 8 in the downstream side return unit 6 checks, in the case of workpieces, to see if the assembling and machining apparatus 1 has completed machining on all the workpieces along the transfer path of that apparatus. In the case of part feeding pallets, 4(p) the detecting means 8 checks to see if the pallets 4(p) along the transfer path have all delivered their parts. The finished workpieces 4(w) or the empty part feeding pallets 4(p) are not returned to the second path 3 of the apparatus 1. Instead, the finished workpieces are 4(w) transferred to the first transfer path 2 of the assembling and machining apparatus 1b; the empty part feeding pallets 4(p) are ejected out of the production line.

Along the first transfer path 2 in the transfer loop, production units A, B and C are arranged in that order from upstream to downstream.

The units A, B and C have horizontally articulated robots, 9a, 9b and 9c, respectively. When they are reprogrammed as needed, these general-purpose robots 9a, 9b, 9c readily perform different tasks. In addition, each robots 9a, 9b, 9c is flexible enough to switch immediately to another task when responding to assembling-/machining instructions from a control unit.

The production units A, B and C have a detection unit 10 and a transfer unit 11 each.

The detection unit 10 reads an identification tag off each of the workpieces or part feeding pallets 4, 4, etc. The ID tag allows the detection unit 10 to determine whether or not the currently detected workpiece or part feeding pallet 4, 4, etc. is to be taken into the working area 12 of the robot 9.

Each detection unit 10 is fixedly mounted in such a manner that it will not interfere with the flow of the workpieces or part feeding pallets 4, 4, etc. along the first transfer path 2.

The transfer units 11 are each equipped with a retrieving mechanism 13, a returning mechanism 14 and an ID attaching unit 15. The retrieving mechanism 13 retrieves the workpieces or part feeding pallets 4, 4, etc. from the first transfer path 2 into the working area 12 of the robot 9. The returning mechanism 14 returns the finished workpiece 4(w) or the empty part feeding pallet 4(p) to the first transfer path 2. The ID attaching unit 15 attaches a specific signal to the ID tag of the finished workpiece 4(w) or of the empty part feeding pallet 4(p) upon relocation thereof to the first transfer path 2, the signal indicating that the required machining or assembling has been completed.

When the detection unit 10 detects a workpiece 4(w) that requires machining by the current robot 9, the retrieving mechanism 13 takes the workpiece 4(w) into the working area 12 of the robot 9.

If the workpiece 4(w) requires assembling a specific part thereto, the detection unit 10 whereupon detects a part feeding pallet 4(p) that contains the appropriate part. Then another retrieving mechanism 13 takes the part feeding pallet 4(p) into another location of the working area 12. In this manner, the robot 9 carries out necessary work on the workpiece 4(w) within its working area 12 (by retrieving the part from the pallet 4(p) for assembling where needed).

After completion of work by the robot 9, the finished workpiece 4(w) and/or the empty part feeding pallet 4(p) is returned by the returning mechanism(s) 14 to the first transfer path 2. Upon relocation to the first transfer path 2, the ID attaching unit 15 attaches a new ID tag to the workpiece 4(w) and/or the part feeding pallet 4(p). The ID tag attached to the workpiece 4(w) says that work thereon has been completed by the robot 9, and the ID tag on the part feeding pallet 4(p) says that the pallet has duly delivered its part.

When work on the workpiece 4(w) is completed by the production units A, B and C, the completion of work thereon is detected by the detecting means 8 in the return unit 6. The workpiece 4(w) is then transferred not to the second transfer path 3 of the current apparatus 1 but to the next assembling and machining apparatus 1b.

When the part is delivered from the part feeding pallet 4(p), the completion of part delivery is detected by the detecting means 8 in the return unit 6. The empty part feeding pallet 4(p) is then ejected out of the production line.

Constructed as described, the assembling and machining apparatus 1 permits easy modification of the assembling/machining setup.

Figure 5:
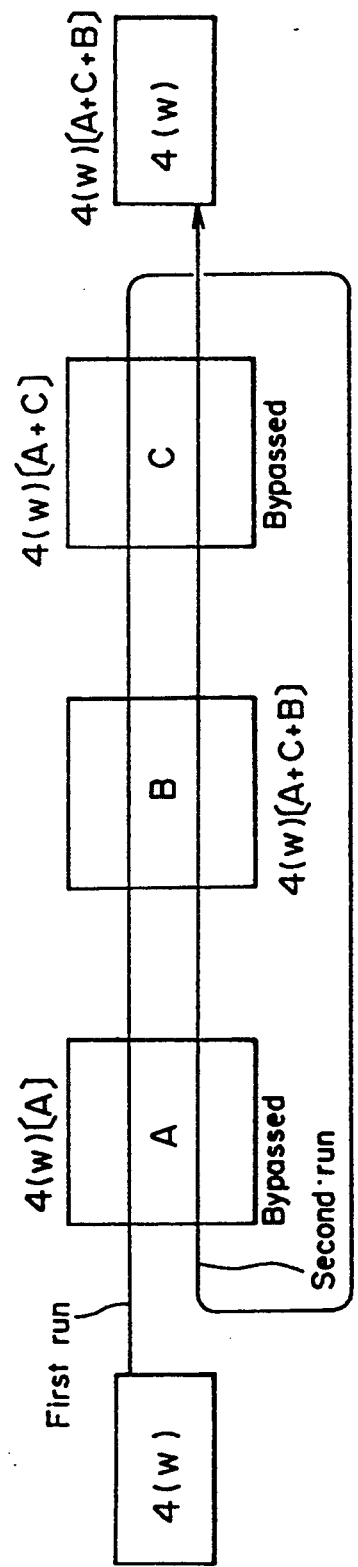
FIG. 5 is a view depicting a modified flow of workpieces within the embodiment when the assembling-/machining sequence is changed.

Now suppose that the workpiece 4(w) that moved through the units A, B and C, in that order, is required to go through the units A, C and B, in that order. (The workpiece 4(w) finished by a given unit is indicated hereunder as 4(w) [X] (X=A, A+B, A+B+C, etc.)). In that case, the workpiece 4(w) is first taken into and machined by the production unit A (4(w) [A]). After this, the workpiece 4(w) [A] is returned to the first transfer path 2 in order to bypass the unit B. The workpiece 4(w) [A] is then taken into and machined by the production unit C (workpiece 4(w) [A+C]). The return unit 6 places the workpiece 4(w) [A+C] onto the second transfer path 3 simply for transfer to the return unit 5. In turn, the return unit 5 again places the workpiece 4(w) [A+C] onto the first transfer path 2. After bypassing the unit A, the workpiece 4(w) [A+C] is taken into and machined by the unit B. The workpiece 4(w) [A+C+B] then bypasses the unit C and is sent to the return unit 6. The detecting means 8 in the return unit 6 checks to see if machining is completed on the workpiece 4(w) [A+C+B]. When machining is found to be completed on the workpiece, 4(w) [A+C+B] the workpiece is transferred to the next assembling and machining apparatus 1b. If unfinished, the workpiece 4(w) is returned to the second transfer path 3. FIG. 5 illustrates how the workpiece 4(w) circulates throughout the apparatus 1. In the manner described, the production sequence may be modified with no need whatsoever to change the physical positions of the units A, B and C.

Now suppose that it takes the units A, B and C different lengths of time to accomplish their respective tasks, with the unit C taking the longest to do its job. In that case, if the part feeding pallet 4(p) is found to have exhausted its part while the unit B is working, the robot 9b of the unit B stands idle until fed with a new part from the next part feeding pallet 4(p). During the idle time, the unit B may take in the part feeding pallet 4(p) pertaining to the unit C to help out the unit C in carrying out its task. This enhances the efficiency of assembling and machining.

Figure 6:
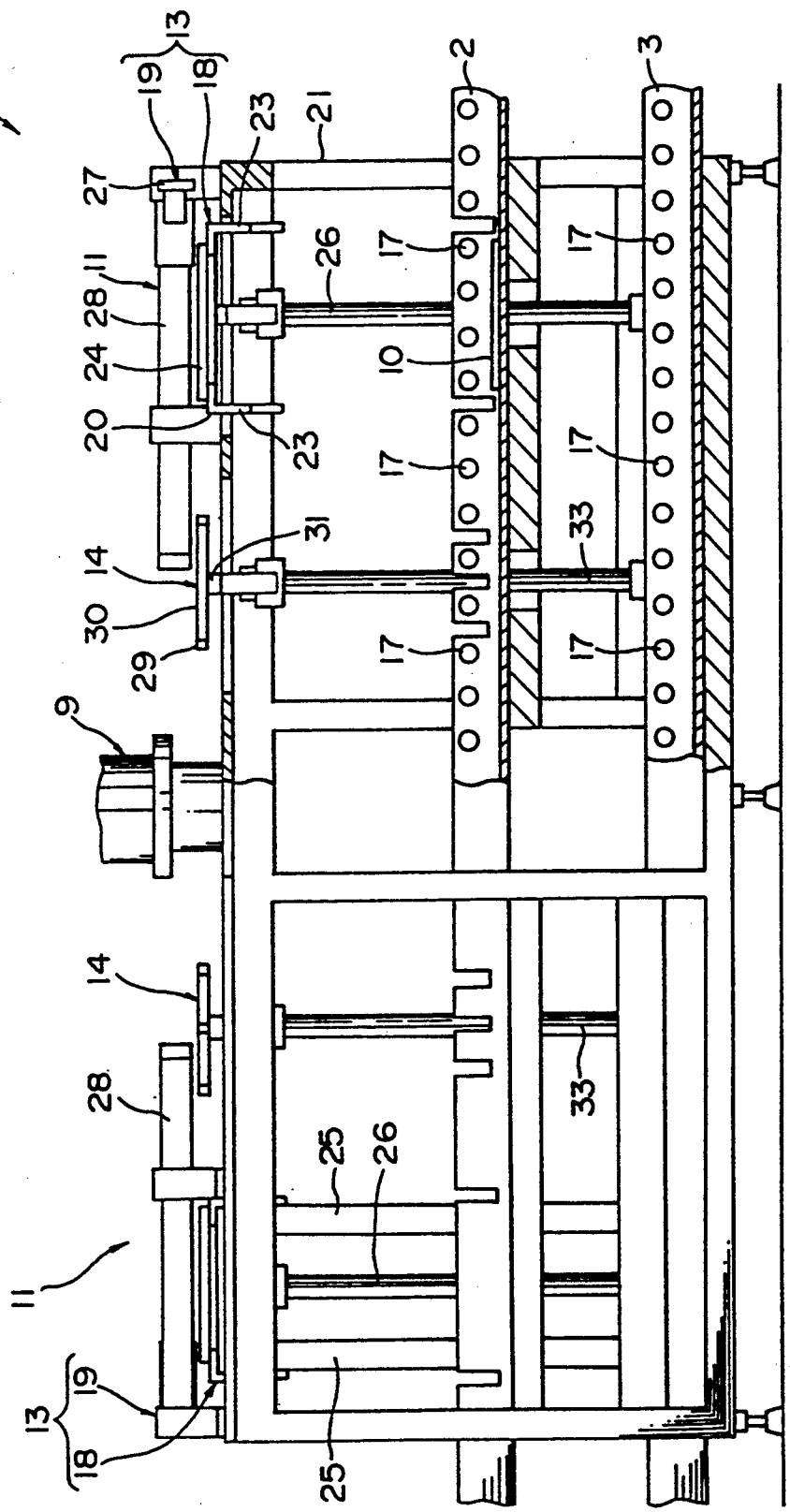
FIG. 6 is a partially broken side view of an assembling/machining unit of the embodiment.
Figure 7:
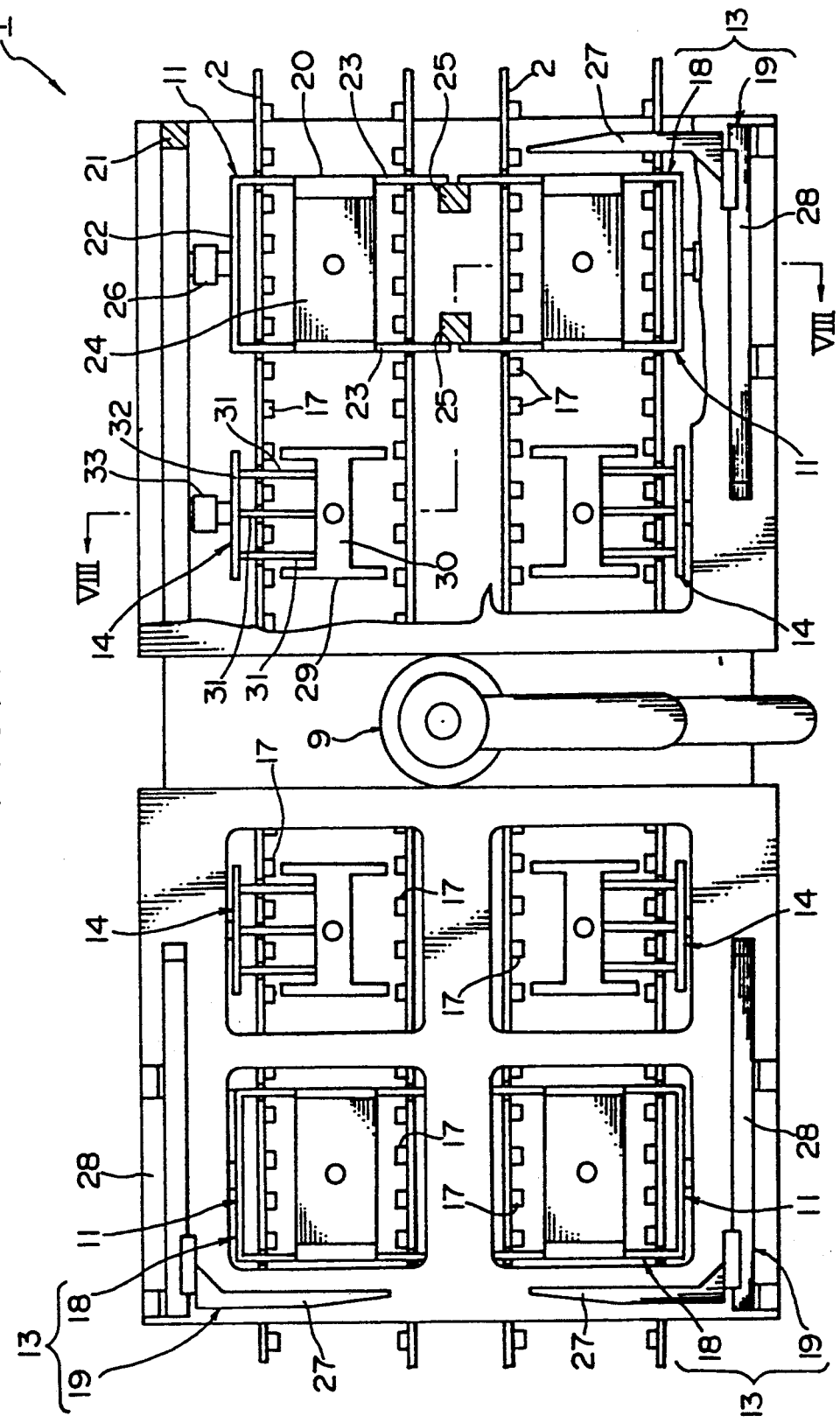
FIG. 7 is a partially broken plan view of an assembling/machining unit of the embodiment.
Figure 8:
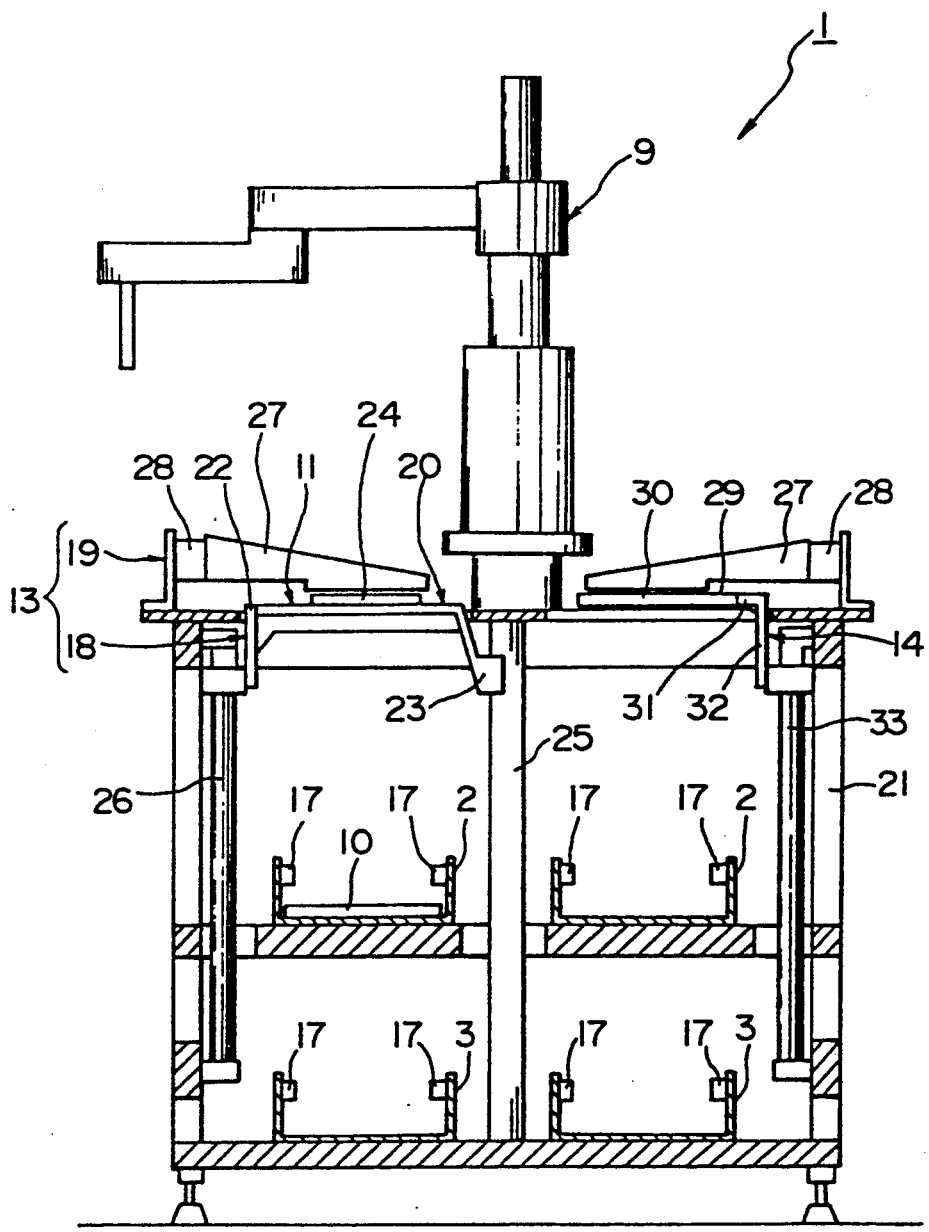
FIG. 8 is a sectional view taken on line VIII—VIII of FIG. 7.
Figure 9:
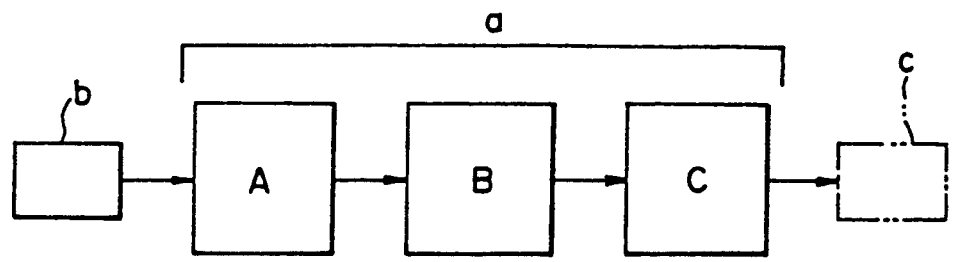
FIG. 9 is a view describing a production unit configuration of a typical prior art assembling and machining apparatus.
Figure 10:
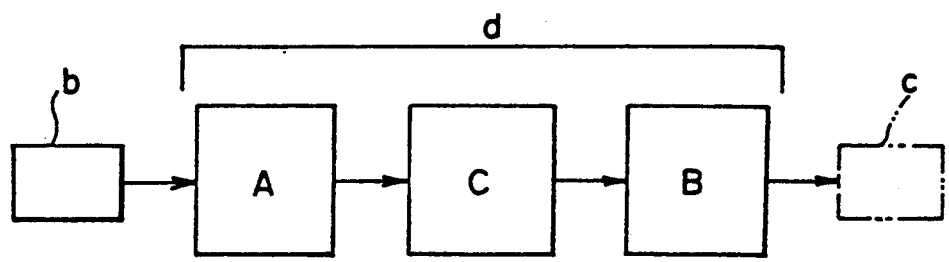
FIG. 10 is a view illustrating how the production units of FIG. 9 need to be physically changed in position to accommodate a production sequence modification.

How a production unit (one of A, B and C) of the apparatus 1 works will now be described in detail with reference to FIGS. 3 and 6 through 8. As depicted in FIGS. 6 and 7 for example two first transfer paths 2 and 2 are assumed to be set up in parallel. Between the two first transfer paths 2 and 2 is a horizontally articulated robot 9.

Figure 3:
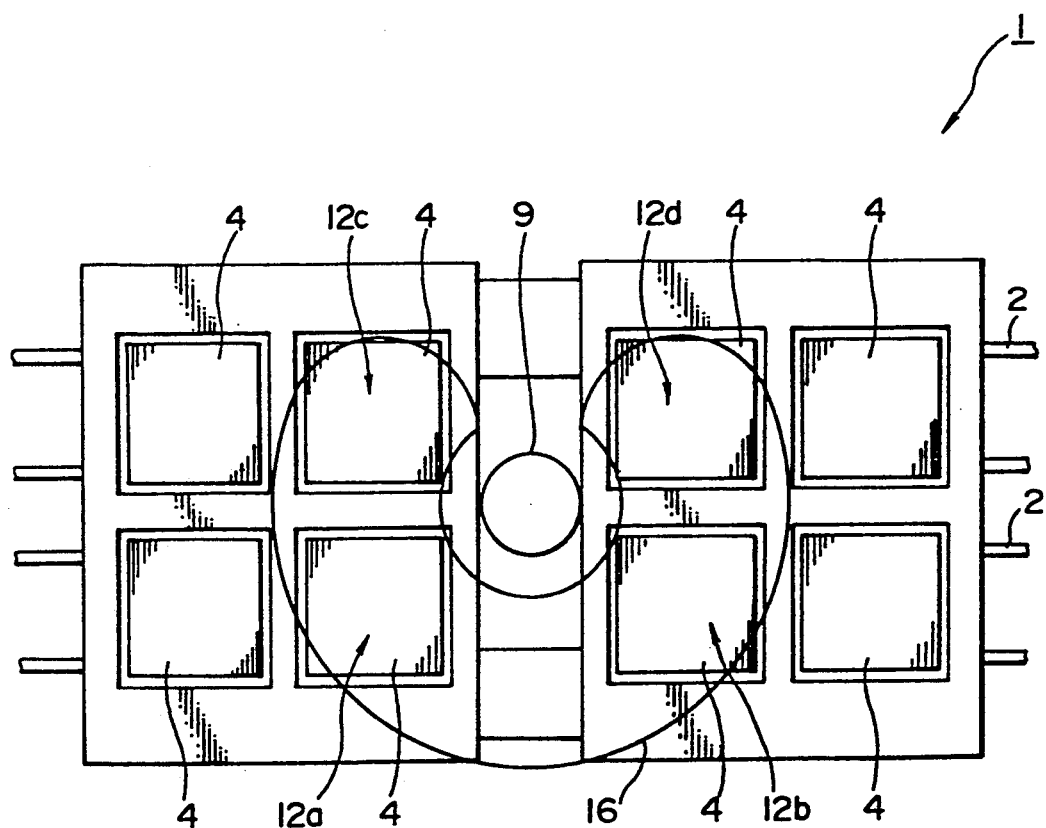
FIG. 3 is a plan view of an assembling/machining unit of the embodiment.
Figure 4:
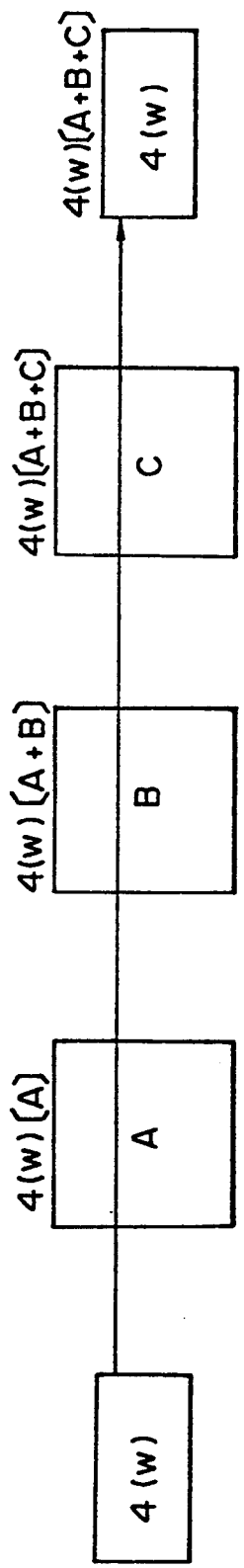
FIG. 4 is a view showing a typical flow of workpieces within the embodiment.

Thus as shown in FIG. 3, the robot 9 has a working area 16 comprising four working regions 12a, 12b, 12c and 12d. As seen in FIG. 7, there are provided four transfer units 11a, 11b, 11c and 11d in conjunction with the four working regions.

The transfer paths, 2, 2, . . . , 3, 3, . . . are each constructed as a roller conveyor. Workpiece and/or part feeding pallets 4, 4, etc. are each supported at both edges by rollers 17, 17, etc.

The retrieving mechanism 13 of each transfer unit 11 is constituted by a lifting unit 18 and a retracting unit 19.

An elevator 20 is provided where illustrated. The elevator 20 comprises: a base 22 extending along the side of a frame 21; arms 23 and 23 mounted on the base 22 and projecting away from the side of the frame 21; and a table 24 spanned across the arms 23 and 23. The arms 23 and 23 are located between adjacent rollers 17, 17, etc. in a vertically movable manner. The tips of the arms 23 and 23 are slidingly supported in the vertical direction by intermediate walls 25 of the frame 21.

A cylinder 26 is fixedly mounted on the side of the frame 21. The elevator 20 is moved up and down by the cylinder 26. The elevator 20 and cylinder 26 constitute the lifting unit 18.

A push plate 27 is moved lengthwise (i.e., in the direction in which workpieces and/or part feeding pallets are transferred) by a cylinder 28 located along the top side of the frame 21. The push plate 27 and cylinder 28 constitute the retracting unit 19.

Another elevator 29 is provided in conjunction with the returning mechanism 14. The elevator 29 comprises: an H-shaped table 30; arms 31, 31, etc. projecting from the middle member of the table 30 toward the side; and a base 32 that connects the ends of the arms 31, 31, etc. The arms 31, 31, etc. are located between adjacent rollers 17, 17, etc. in a vertically movable manner. The ID attaching unit 15 is mounted on the bottom of the table 30.

A cylinder 33 is fixedly mounted on the side of the frame 21. The elevator 29 is moved up and down by the cylinder 33. The elevator 29 and cylinder 33 constitute the returning mechanism 14.

In initial state, the elevator 20 of the lifting unit 18 is located below the rollers 17, 17, etc. of the first transfer path 2. The push plate 27 of the retracting unit 19 is located farthest from the current working area 12. The elevator 29 of the returning mechanism 14 is positioned within the working area 12.

Of the workpieces 4(w) and part feeding pallets 4(p) moving along the first transfer path 2, the one to be taken into the working area 12 is detected by the detection unit 10. Upon detection, the elevator 20 goes up, raising the appropriate workpiece or part feeding pallet 4 to an upper position 18b past an intermediate position 18a. If the working area 12 is still occupied by the preceding workpiece or part feeding pallet 4, the elevator 20 waits at the intermediate position 18a. At this point, if the push plate 27 is located farthest from the current working area 12, the elevator 20 goes to the upper position 18b and waits there until the working area 12 is cleared. In this manner, the positions 18a and 18b of the lifting unit 18 offer "buffer" positions where the workpiece or part feeding pallet 4 is temporarily halted until it is allowed to proceed.

When the workpiece or part feeding pallet 4 reaches the upper position 18b, the push plate 27 of the retracting unit 19 moves toward the working area 12, pulls the workpiece or part feeding pallet 4 into the area 12, and places the workpiece or pallet 4 onto the elevator 29 of the returning mechanism 14 that is already in the area 12. Once the workpiece or part feeding pallet 4 is delivered to the working area 12, the elevator 20 of the lifting unit 18 and the push plate 27 of the retracting unit 19 return to their initial positions.

Thereafter, work is performed by the robot 9 on the workpiece or part feeding pallet 4 taken into the working area 12.

When the robot 9 has terminated its work, the ID attaching unit 15 attaches a new ID tag to the finished workpiece or to the empty part feeding pallet 4. The elevator 29 of the returning mechanism 14 comes down past an intermediate position 14a to the level of the first transfer path 2. There, the workpiece or part feeding pallet 4 is handed over to the first transfer path 2. If the first transfer path 2 is full at this point, the intermediate position 14a provides a "buffer" position where the workpiece or part feeding pallet 4 is temporarily halted.

As described and according to the first aspect of the invention, there is provided an assembling and machining apparatus comprising the following components. A first and a second transfer path are disposed one on top of the other. The first and the second transfer paths are provided for transferring in opposite directions any one of two object groups, one group consisting of workpieces and the other group consisting of part feeding pallets. A return unit is interposed anywhere between an intermediate point and the downstream end, inclusive, of the first path and the second path. This return unit relocates any one of the two object groups from the first transfer path to the second transfer path. Another return unit is provided for relocating any one of the two object groups from the second transfer path to the first transfer path. A plurality of assembling/machining units are positioned above the first transfer path. A plurality of first detection units are mounted on the first transfer path close to the plurality of assembling/machining units. These first detection units are provided for detecting the type and status of any one of the two object groups on the first transfer path. And a plurality of transfer units are located adjacent to working areas of the plurality of assembling/machining units. These transfer units are provided for retrieving from the first transfer path any one of the two object groups detected by any of the plurality of first detection units for any of later machining and assembling. The transfer units further serve to return any one of the two object groups to the first transfer path after any of the machining and assembling.

According to the second aspect of the invention, there is provided an assembling and machining apparatus of the above type further characterized as follows. The return units of the apparatus comprise a plurality of second detection units for detecting information about any one of the two object groups so that in any one of two cases, i.e., one in which the machining on a workpiece is completed and the other in which a part feeding pallet has delivered the part assigned thereto, any one of the workpiece and the part feeding pallet will be placed onto the first transfer path for transfer out of the assembling and machining apparatus.

According to the third aspect of the invention, there is provided an assembling and machining apparatus of the above type further characterized as follows. Each of the plurality of transfer units comprises a retrieving mechanism and a returning mechanism. The retrieving mechanism is provided for retrieving from the first transfer path any one of the two object groups for relocation to the working area of each of the plurality of assembling/machining units. The returning mechanism is provided for returning any one of the two object groups to the first transfer path after any of assembling and machining by each of the plurality of assembling/machining units.

With the above assembling and machining apparatus, workpieces and/or part feeding pallets circulate throughout the loop-like transfer path made up of the first and second transfer paths as well as of the two return units. Of the circulating workpieces and/or part feeding pallets, those needed by each assembling/machining unit are taken into its working area via a transfer unit for assembling and/or machining. The workpiece machined by one assembling/machining unit or the part feeding pallet having delivered its part thereto is returned to the transfer path by the transfer unit for relocation to the next assembling/machining unit. The process is performed by each assembling/machining unit. When all work is completed on a workpiece or part feeding pallet, that workpiece or pallet is detected and is either handed over by the return unit to the transfer path of the next adjacent assembling and machining apparatus or ejected out of the production line.

Every workpiece on which all work is completed is thereupon ejected out of the current assembling and machining apparatus. This allows machining to proceed without rearranging the physical configuration of the assembling/machining units when a new workpiece specification requires modifying the assembling/machining setup in a manner sequentially different from the physical unit configuration.

Where the assembling/machining units of the current assembling and machining apparatus take different lengths of time to complete their respective tasks, some units complete their machining or assembling work earlier than the others. In that case, each unit that stands idle having completed its task is programmed to help out the other units in carrying out their jobs. This enhances the efficiency of assembling and machining work.

Although the description above contains many specificities, these should no be construed as limiting the scope of the invention but as merely providing illustrations of some of the presently preferred embodiment of this invention. For example, the separately provided ID attaching unit, mounted on the elevator in the above-described embodiment, may not be needed; it may be taken over by the detection unit 10 modified to provide ID attaching capabilities. Since every workpiece and part feeding pallet on which work is completed passes above the detection unit located downstream of the apparatus, suitably modifying the detection unit is all it takes for that unit to attach ID information to the workpiece or part feeding pallet.

Thus the scope of the invention should be determined by the appended claims and their legal equivalents, rather than by the examples given.

What is claimed is:

1. An assembling and machining apparatus having transfer means for workpieces and parts, comprising:
    a first and a second transfer path disposed one on the top of the other, said first and second transfer paths transferring in opposite directions any one of two object groups, one group consisting of workpieces and the other group consisting of part feeding pallets;
    a first return unit interposed anywhere between an intermediate point and the downstream end, inclusive, of said first path and second path, said first return unit relocating any one of said two object groups from said first transfer path to said second transfer path;
    a second return unit for relocating any one of said two object groups from said second transfer path to said first transfer path;
    a plurality of assembling or machining units positioned above said first transfer path;
    a plurality of first detection units mounted on said first transfer path close to said plurality of assembling or machining units, said plurality of first detection units detecting the type and status of any one of said two object groups on said first transfer path; and
    a plurality of transfer units located adjacent to working areas of said plurality of assembling or machining units, said plurality of transfer units retrieving from said first transfer path any one of said two object groups detected by any of said plurality of first detection units for any of later machining and assembling, said plurality of transfer units further returning any one of said two objects groups to said first transfer path after any of said machining and assembling.

2. An assembling and machining apparatus according to claim 1, wherein said first and second return units comprise a plurality of second detection units for detecting information about any one of said two object groups so that in any one of two cases, one in which the machining on a workpiece is completed and the other in which a part feeding pallet has delivered the part assigned thereto, said workpiece and said part feeding pallet will be placed onto said first transfer path for transfer out of said assembling and machining apparatus.

3. An assembling and machining apparatus according to claim 2, wherein each of said plurality of transfer units comprises:
    a retrieving elevator mechanism for retrieving from said first transfer path any one of said two object groups for relocation to the working area of each of said plurality of assembling or machining units; and
    a returning elevator mechanism for returning any one of said two object groups to said first transfer path after any of assembling and machining by each of said plurality of assembling or machining units.

* * * * *